April 5, 1938.   A. BÜCHI   2,113,077
SUPERCHARGED INTERNAL COMBUSTION ENGINE
Filed Feb. 21, 1935   2 Sheets-Sheet 1

Inventor:
Alfred Büchi
By Sommers & Young
Attys.

April 5, 1938.　　　A. BÜCHI　　　2,113,077

SUPERCHARGED INTERNAL COMBUSTION ENGINE

Filed Feb. 21, 1935　　　2 Sheets-Sheet 2

Inventor:
Alfred Büchi
By Sommers & Young
Attys.

Patented Apr. 5, 1938

2,113,077

UNITED STATES PATENT OFFICE 2,113,077

SUPERCHARGED INTERNAL COMBUSTION ENGINE

Alfred Büchi, Winterthour, Switzerland

Application February 21, 1935, Serial No. 7,656
In Switzerland February 23, 1934

2 Claims. (Cl. 60—13)

This invention relates to multi-cylinder V-type exhaust turbo-blower supercharged internal combustion engines.

The invention resides in disposing two exhaust turbo-blower aggregates within the V-shaped open space one each at either face end of the engine and leading to the turbine of each aggregate the exhaust gases from one part of each row of cylinders for energizing the respective turbines separately, the output of supercharging air of the blowers being passed to the entirety of cylinders through a common intercommunicating conducting system.

The arrangement of the exhaust turbo-blower aggregates may be so chosen according to the invention that either the exhaust gas turbines or else the supercharging blowers are situated at the exterior ends of the respective aggregates adjacent to the face ends of the engine.

Figure 4:
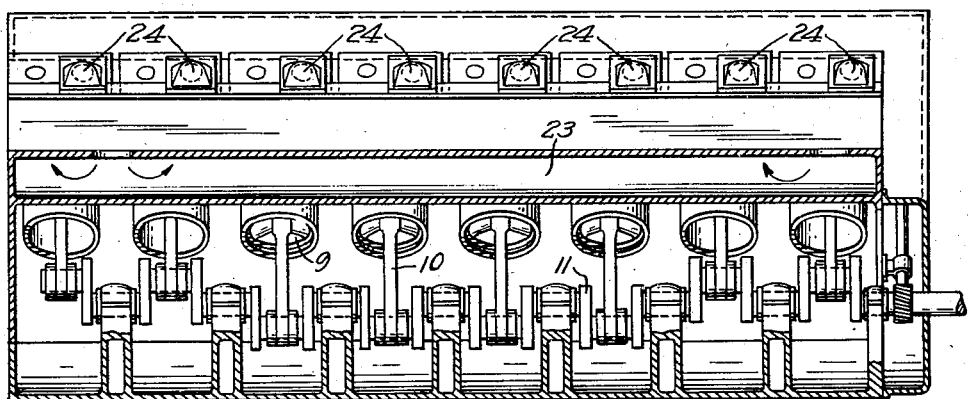
Figure 1:
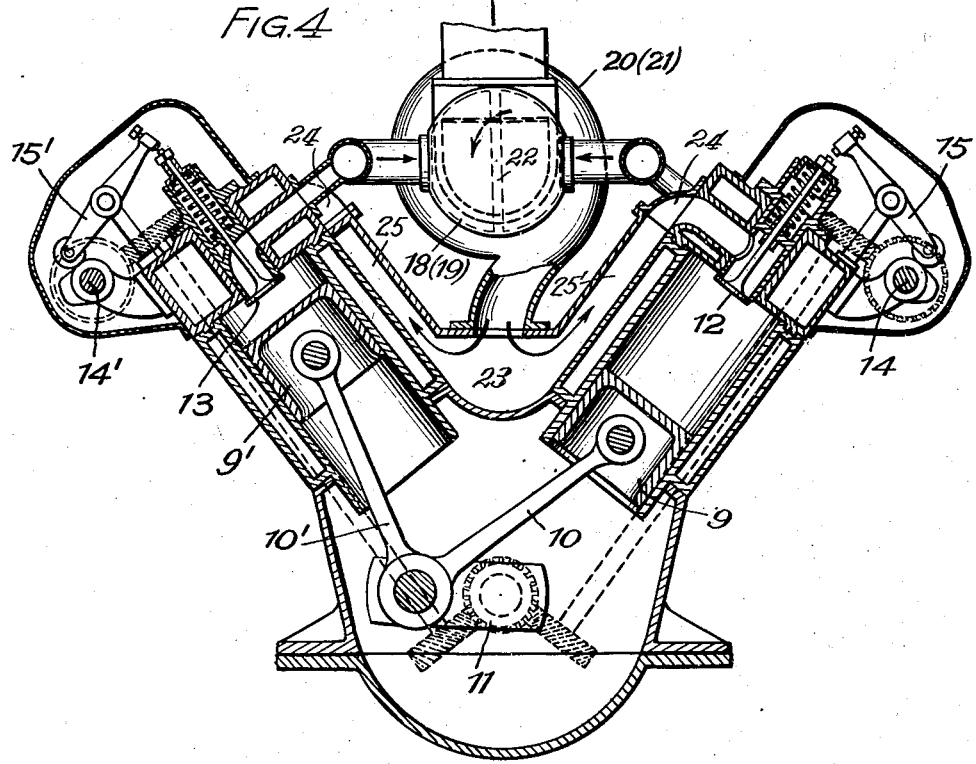
Figure 2:
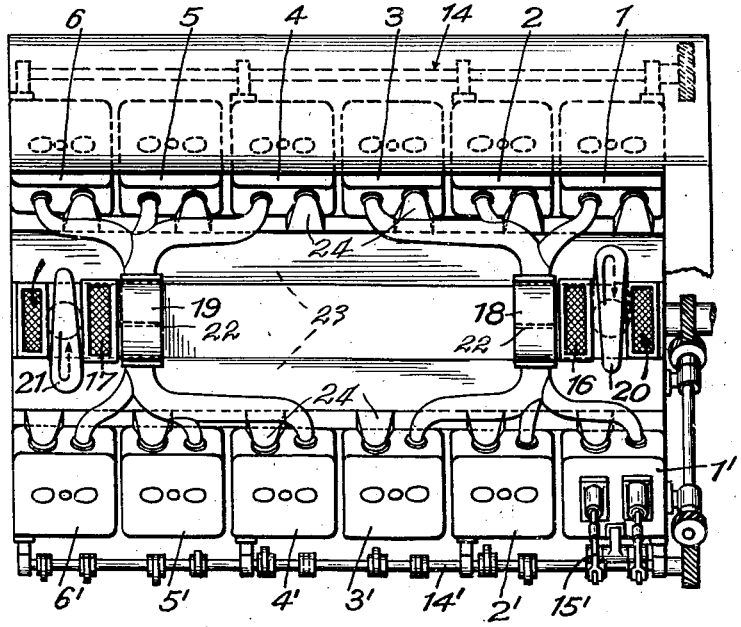
Figure 3:
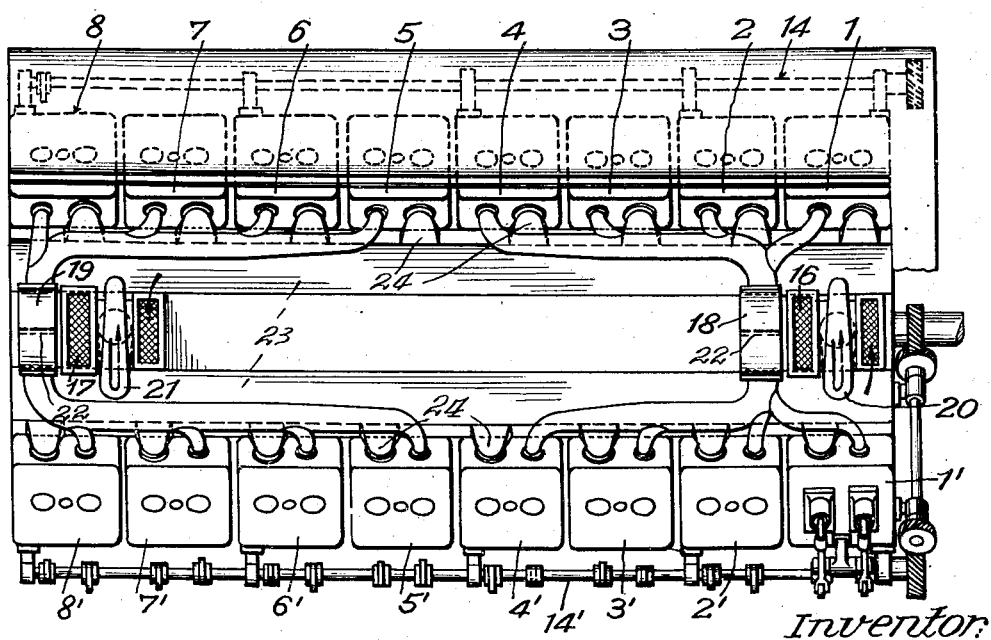

In the accompanying drawings two constructional forms of the invention are shown by way of example only, in which Fig. 1 shows a cross-section of an internal combustion engine according to the invention, Figs. 2 and 3 each show a corresponding plan view of a twelve and a sixteen-cylinder engine respectively, and Fig. 4 is a vertical longitudinal section through the axis of the internal combustion engine.

In all the figures of the drawings like characters represent like parts.

By 1, 2, 3, 4, 5, 6, 7 and 8 the combustion cylinders of one row of the engine are designated and by 1', 2', 3', 4', 5', 6', 7' and 8' those of the other row of the engine.

The internal combustion engine comprises pistons 9 and 9' respectively, piston rods 10 and 10' respectively which cooperate with a crank-shaft 11. 12 refers to the inlet and 13 to the exhaust valves, these valves being situated in the cylinder heads in the engine and actuated by means of control shafts 14 and 14' respectively through the intermediary of tappets 15 and 15' respectively. Water cooled jackets surrounding the cylinder walls are designated by numerals 25, 25'. The engine is provided with two exhaust turbo-blower aggregates 16 and 17 which are disposed within the open portion of the V-shaped part of the engine at the face ends of the latter. The numerals 18 and 19 represent the exhaust gas turbines and 20 and 21 the blowers driven thereby. The arrangement may be such that the turbine 19 is situated at the extreme face end of the engine, as shown in Fig. 3 to the left, or else the blower 20 may occupy the exteriormost position at the face end of the engine, as shown in Figs. 2 and 3 to the right.

According to the invention to each turbine 18 and 19 the exhaust gases from the one part of each row of cylinders of the engine are led, in such a way, that in the examples shown, half the number of cylinders of each row of cylinders exhaust separately for each row into the exhaust gas turbine 18, whereas the remaining half number of cylinders exhaust separately for each row into the exhaust gas turbine 19. Therefore, not all the cylinders of one row of cylinders discharge into one and the same exhaust turbine. In order to provide for the exhaust puffs of the cylinders of different rows not interfering with each other, particularly so that the scavenging operation in the individual cylinders is not frustrated, the exhaust gases from different cylinder blocks are passed into separate admission spaces or nozzles of the respective turbine, said admission spaces being separated from each other by partition walls 22, shown in all the figures of the drawings. In Fig. 4, which represents a vertical longitudinal section through the axis of the internal combustion engine from which the two blowers 16, 17 have been omitted for the sake of clarity, the passage 23 is shown to extend along the full length of the engine. The air is conducted into this passage through two upper openings, as shown, one of which is visible in Fig. 1 also. The pre-compressed supercharging air delivered by the blowers 20 and 21 passes to the inlet valves 12 of the engine through intercommunicating passages 23, 24 that are also situated within the V-shaped open space of the engine. Alternatively, the construction may be such that the frame of the engine itself or portions thereof form conduction means for the supercharging air, as shown in cross-section in Fig. 1 for the main duct or collecting space 23 of the intercommunicating passages.

The invention provides for a very advantageous arrangement of the conduction means for the exhaust gases and the supercharging air, as it is simple and symmetrical and thus easy to inspect.

By virtue of the arrangement of a supercharging air conducting system intercommunicating with all the cylinders of the engine the supply of supercharging air is rendered uniform for all cylinders. Disposing the exhaust turbo-blower aggregates at the face ends of the engine results in free accessibility to these aggregates without substantially complicating the arrangement of the conducting system.

By disposing the conducting means for the supercharging air within the open V-shaped space of the engine frame the conduction of this air to the numerous cylinders is considerably simplified, while at the same time these means are completely separated from the hot exhaust conduits and are positioned against the water cooled jackets of the engine so that the compression heat of the charging air is taken up by the water jacket.

I do not limit myself to the particular size, shape, number or arrangement of parts as shown and described, all of which may be varied without going beyond the scope of my invention as shown, described and claimed.

What I claim is:

1. In a supercharged multi-cylinder internal combustion engine, two rows of cylinders arranged in blocks forming a V, water cooled jackets around said rows of cylinders, a turbo-blower unit disposed in said V at an end thereof with the turbine thereof outermost so as to be accessible to the operator for inspection and care, exhaust pipes from the exhausts of the cylinders of said engine to the turbo-blower, and a common supercharging air conduit supplying air from the blower to the cylinders, said conduit comprising a jacket on the inner faces of the cylinders within the V, the water cooled jackets lying between the turbo-blower and exhaust pipes and the engine cylinders, and in contact with the supercharging air jacket.

2. In a supercharged multi-cylinder internal combustion engine, two rows of cylinders arranged in blocks and forming a V, water cooled jackets on the inner faces of the rows of cylinders, a pair of turbo-blower units utilizing the exhaust gas of the engine and supplying compressed air for supercharging the engine cylinders, said units being located in the V and each at one end thereof, conduits connecting the exhaust openings of the cylinders with the turbo compressors, and a casing covering the inner side faces of the water cooled jackets of both cylinder blocks, the blowers of said units discharging into said casing and the air inlets of the cylinders being connected with said casings to receive charging air therefrom, the water cooled jackets of the cylinder blocks lying between exhaust pipes and turbo-blower and in contact with the supercharging air casing.

ALFRED BÜCHI.